United States Patent [19]
Michaels et al.

[11] Patent Number: 5,824,223
[45] Date of Patent: Oct. 20, 1998

[54] METHODS AND APPARATUS FOR OSMOTIC DISTILLATION

[75] Inventors: Alan Sherman Michaels, Chestnut Hill, Mass.; Robert Johnson, Queensland, Australia

[73] Assignee: Rentiers Machinery Proprietary Ltd., Victoria, Australia

[21] Appl. No.: 555,209

[22] Filed: Nov. 8, 1995

[51] Int. Cl.⁶ .......................... B01D 11/04; B01D 11/00; B01D 43/00

[52] U.S. Cl. .......................... 210/642; 210/644; 210/645; 210/640; 210/257.2; 426/14; 426/239; 426/495

[58] Field of Search .................. 210/642, 644, 210/645, 640, 257.2; 426/13, 14, 239, 455

[56] References Cited

U.S. PATENT DOCUMENTS

| | | |
|---|---|---|
| 2,611,490 | 9/1952 | Robinson .................. 210/130 |
| 3,186,917 | 6/1965 | Gerhardt et al. . |
| 3,291,613 | 12/1966 | Raible . |
| 3,335,545 | 8/1967 | Robb et al. . |
| 3,502,651 | 3/1970 | Oldenburg . |
| 3,552,574 | 1/1971 | Lowe et al. ................ 210/353 |
| 3,721,621 | 3/1973 | Hough .................. 210/642 |
| 3,847,163 | 11/1974 | Molyneux . |
| 3,865,960 | 2/1975 | Wucherpfennig et al. ............ 426/239 |
| 3,865,961 | 2/1975 | Wucherpfennig et al. ............ 426/239 |
| 3,915,820 | 10/1975 | Ito et al. .................. 204/149 |
| 3,956,112 | 5/1976 | Lee et al. . |
| 4,015,020 | 3/1977 | Nagasawa et al. ............ 426/239 |
| 4,083,904 | 4/1978 | Sano et al. ................ 264/41 |
| 4,187,390 | 2/1980 | Gore . |
| 4,218,312 | 8/1980 | Perry . |
| 4,268,279 | 5/1981 | Shindo et al. . |
| 4,401,678 | 8/1983 | Beaumont . |
| 4,499,117 | 2/1985 | Bonneau .................. 526/592 |
| 4,532,140 | 7/1985 | Bonnome .................. 426/13 |
| 4,539,117 | 9/1985 | Meyer et al. ............ 210/639 |
| 4,581,236 | 4/1986 | Bandel et al. ............ 426/14 |
| 4,610,791 | 9/1986 | Henne et al. ............ 210/490 |
| 4,610,887 | 9/1986 | Galzy et al. ............ 426/490 |
| 4,612,196 | 9/1986 | Goldstein et al. ............ 426/14 |
| 4,617,127 | 10/1986 | Light .................. 210/651 |
| 4,655,927 | 4/1987 | Ford .................. 210/639 |
| 4,728,431 | 3/1988 | Nagura et al. ............ 210/640 |
| 4,778,688 | 10/1988 | Matson .................. 426/425 |
| 4,781,837 | 11/1988 | Lefebvre .................. 210/640 |

(List continued on next page.)

FOREIGN PATENT DOCUMENTS

| | | |
|---|---|---|
| 33543/68 | 8/1972 | Australia . |
| 41 09 08012041 | 3/1991 | Germany . |
| 53-24568 | 7/1978 | Japan . |
| 64-23882 | 1/1989 | Japan . |
| 3-30663 | 2/1991 | Japan . |
| 3-89922 | 4/1991 | Japan . |
| 1447505 | 8/1976 | United Kingdom . |
| 1079517 | 8/1987 | United Kingdom . |
| WO87/02380 | 4/1987 | WIPO . |
| WO88/05768 | 8/1988 | WIPO . |
| WO93/0825 | 4/1993 | WIPO . |

OTHER PUBLICATIONS

The Merck Index, 11th Edition, 1989, No. 7647.

Michaels, A.S. and H.J. Bixler, "Membrane Permeation: Theory and Practice" *Progress in Separation and Purification*, edited by E.S. Perry, John Wiley & Sons, Inc., New York, 1968, vol. 1, pp. 143–186.

*Primary Examiner*—Ana Fortuna
*Attorney, Agent, or Firm*—Woodcock Washburn Kurtz Mackiewicz & Norris LLP

[57] ABSTRACT

Methods and apparatus are provided for osmotic distillation employing dehydrating aqueous solutions of potassium salts of phosphoric acid, pyrophosphoric acid, acetate, and blends thereof. Methods are also provided for the simultaneous osmotic distillation and removal of carbon dioxide from a sample of relatively low osmotic pressure employing alkaline potassium orthophosphate and pyrophosphate dehydrating solutions.

9 Claims, 16 Drawing Sheets

U.S. PATENT DOCUMENTS

| | | | |
|---|---|---|---|
| 4,921,612 | 5/1990 | Sirkar | 210/644 |
| 4,952,751 | 8/1990 | Blume et al. | 585/818 |
| 4,983,303 | 1/1991 | Uragami | 210/640 |
| 5,037,554 | 8/1991 | Nomi | 210/640 |
| 5,066,403 | 11/1991 | Dutta et al. | 210/638 |
| 5,076,932 | 12/1991 | Taylor | 210/640 |
| 5,130,024 | 7/1992 | Fujimoto . | |
| 5,143,526 | 9/1992 | Lee et al. | 55/158 |
| 5,281,430 | 1/1994 | Herron et al. | 426/490 |
| 5,382,364 | 1/1995 | Bowser et al. | 210/640 |
| 5,382,365 | 1/1995 | Deblay | 210/644 |

| SOLUBILITY/TEMPERATURE RELATIONSHIPS FOR POTASSIUM PHOSPHATE SOLUTIONS ||||||
|---|---|---|---|---|---|
| SALT | (MW) | SOLUBILITY ||||
| | | TEMP, oC | g/Kg H2O | g/LITER SOL'N | DENSITY, g/ml |
| KH2PO4 | 136 | 20 | 250 | 220 | 1.13 |
| | | 30 | 306 | 272 | 1.16 |
| | | 40 | 370 | 321 | 1.19 |
| | | 50 | 441 | 374 | 1.22 |
| | | 60 | 521 | 429 | 1.25 |
| | | 70 | 610 | 486 | 1.28 |
| | | 80 | 707 | 544 | 1.31 |
| | | 90 | 814 | 603 | 1.34 |
| | | 100 | 929 | 662 | 1.37 |
| | | 105.1 | 990 | 713 | 1.39 |
| | | TEMP, oC | g/Kg H2O | g/LITER SOL'N | DENSITY, g/ml |
| K2HPO4 | 174 | 25 | 2550 | 1240 | 1.72 |
| | | 30 | 2591 | 1246 | 1.73 |
| | | 40 | 2672 | 1268 | 1.74 |
| | | 50 | 2750 | 1288 | 1.76 |
| | | 60 | 2825 | 1308 | 1.77 |
| | | 70 | 2898 | 1328 | 1.79 |
| | | 80 | 2968 | 1347 | 1.80 |
| | | 90 | 3036 | 1366 | 1.82 |
| | | 100 | 3102 | 1384 | 1.83 |
| | | 110 | 3166 | 1402 | 1.84 |
| | | 127.1 | 3270 | 1432 | 1.87 |
| | | TEMP, oC | g/Kg H2O | g/LITER SOL'N | DENSITY, g/ml |
| K3PO4 | 212 | 20 | 1078 | 710 | 1.37 |
| | | 30 | 1188 | 756 | 1.39 |
| | | 40 | 1302 | 812 | 1.44 |
| | | 50 | 1419 | 868 | 1.48 |
| | | 60 | 1537 | 923 | 1.52 |
| | | 70 | 1659 | 978 | 1.57 |
| | | 80 | 1782 | 1032 | 1.61 |
| | | 90 | 1906 | 1086 | 1.66 |
| | | 100 | 2032 | 1139 | 1.70 |
| | | 110 | 2159 | 1192 | 1.74 |
| | | 115.6 | 2230 | 1236 | 1.79 |

FIG.2a

| SOLUBILITY / TEMPERATURE RELATIONSHIPS FOR POTASSIUM PYROPHOSPHATE SOLUTIONS |||||
|---|---|---|---|---|
| | | TEMP, °C | g/Kg H2O | g/LITER SOL'N | DENSITY, g/ml |
| KH3P2O7 | 216 | 20 | 2550 | 1180 | 1.64 |
| | | 30 | 2984 | 1255 | 1.68 |
| | | 40 | 3457 | 1327 | 1.71 |
| | | 50 | 3968 | 1395 | 1.75 |
| | | 60 | 4518 | 1460 | 1.78 |
| | | 70 | 5105 | 1520 | 1.82 |
| | | 80 | 5728 | 1578 | 1.85 |
| | | 90 | 6387 | 1634 | 1.89 |
| | | 100 | 7080 | 1687 | 1.93 |
| | | 110 | 7806 | 1738 | 1.96 |
| | | 126.6 | 9080 | 1820 | 2.02 |
| | | TEMP, °C | g/Kg H2O | g/LITER SOL'N | DENSITY, g/ml |
| K2H2P2O7 | 254 | 20 | 1320 | 860 | 1.52 |
| | | 30 | 1496 | 930 | 1.55 |
| | | 40 | 1681 | 992 | 1.58 |
| | | 50 | 1876 | 1052 | 1.61 |
| | | 60 | 2080 | 1111 | 1.64 |
| | | 70 | 2292 | 1167 | 1.68 |
| | | 80 | 2512 | 1221 | 1.71 |
| | | 90 | 2739 | 1273 | 1.74 |
| | | 100 | 2973 | 1324 | 1.77 |
| | | 116.4 | 3370 | 1404 | 1.82 |
| | | TEMP, °C | g/Kg H2O | g/LITER SOL'N | DENSITY, g/ml |
| K3HP2O7 | 292 | 20 | 1770 | 1050 | 1.66 |
| | | 30 | 1993 | 1119 | 1.68 |
| | | 40 | 2228 | 1174 | 1.70 |
| | | 50 | 2473 | 1226 | 1.72 |
| | | 60 | 2728 | 1276 | 1.74 |
| | | 70 | 2992 | 1322 | 1.76 |
| | | 80 | 3264 | 1366 | 1.78 |
| | | 90 | 3544 | 1408 | 1.81 |
| | | 100 | 3831 | 1448 | 1.83 |
| | | 110 | 4125 | 1487 | 1.85 |
| | | 125.8 | 4600 | 1544 | 1.88 |

FIG.2b

| SOLUBILITY/TEMPERATURE RELATIONSHIPS FOR POTASSIUM PYROPHOSPHATE SOLUTIONS ||||||
|---|---|---|---|---|---|
| | | TEMP, oC | g/Kg H2O | g/LITER SOL'N | DENSITY g/ml |
| K4P2O7 | 330 | 25 | 2370 | 1280 | 1.82 |
| | | 30 | 2457 | 1295 | 1.82 |
| | | 40 | 2541 | 1311 | 1.83 |
| | | 50 | 2622 | 1325 | 1.83 |
| | | 60 | 2701 | 1339 | 1.83 |
| | | 70 | 2778 | 1352 | 1.84 |
| | | 80 | 2852 | 1365 | 1.84 |
| | | 90 | 2924 | 1377 | 1.85 |
| | | 100 | 2993 | 1388 | 1.85 |
| | | 110 | 3061 | 1399 | 1.86 |
| | | 120.1 | 3070 | 1403 | 1.86 |

FIG.2c

THERMODYNAMIC PROPERTIES OF POTASSIUM PHOSPHATE SOLUTIONS

| SALT | (MW) | SOLUBILITY AT 20 C | | | | | | |
|---|---|---|---|---|---|---|---|---|
| | | g/Kg H2O | g/LITER SOL'N | DENSITY, g/ml | g mol/Kg H2O | gm eq/Kg H2O | gm eq mol FRACTION | mol FRACTION H2O |
| KH2PO4 | 136 | 250 | 220 | 1.13 | 1.84 | 3.68 | 0.06 | 0.94 |
| K2HPO4 | 174 | 2550 | 1240 | 1.72 | 14.66 | 43.97 | 0.44 | 0.56 |
| K3PO4 | 212 | 1078 | 710 | 1.37 | 5.08 | 20.34 | 0.27 | 0.73 |
| KH3P2O7 | 216 | 2550 | 1180 | 1.64 | 11.81 | 23.61 | 0.30 | 0.70 |
| K2H2P2O7 | 254 | 1320 | 860 | 1.52 | 5.20 | 15.59 | 0.22 | 0.78 |
| K3HP2O7 | 292 | 1770 | 1050 | 1.66 | 6.06 | 24.25 | 0.30 | 0.70 |
| K4P2O7 | 330 | 2370 | 1280 | 1.82 | 7.18 | 35.91 | 0.39 | 0.61 |

FIG.3a

THERMODYNAMIC PROPERTIES OF POTASSIUM PHOSPHATE SOLUTIONS (CONT'D)

| SALT | pH | B.P. AT 1 atm. | VP H2O AT B.P. kPa | P/Po (P=101.2 kPa) | VP AT SAT'N kPa | VP AT SAT'N (IDEAL SOL'N) | ACT. COEFF OF WATER | ACT. COEFF OF SOLUTE |
|---|---|---|---|---|---|---|---|---|
| KH2PO4 | 4.1 | 102.5 | 110 | 0.92 | 3.04 | 3.10 | 0.98 | 1.29 |
| K2HPO4 | 11 | 118.5 | 189 | 0.54 | 1.77 | 1.84 | 0.96 | 1.05 |
| K3PO4 | 14 | 105.9 | 125 | 0.81 | 2.67 | 2.42 | 1.11 | 0.71 |
| KH3P2O7 | 1.8 | 109.3 | 140 | 0.72 | 2.39 | 2.32 | 1.03 | 0.93 |
| K2H2P2O7 | 4.2 | 107.5 | 131 | 0.77 | 2.55 | 2.58 | 0.99 | 1.04 |
| K3HP2O7 | 7.8 | 109.1 | 138 | 0.73 | 2.42 | 2.30 | 1.05 | 0.88 |
| K4P2O7 | 12 | 117.6 | 184 | 0.55 | 1.82 | 2.00 | 0.91 | 1.15 |

FIG.3b

THERMODYNAMIC PROPERTIES OF SOLUTIONS OF SELECTED SALTS

| SALT (MW) | MOLALITY GMol/Kg H2O | OSMOLALITY GMol/Kg H2O | WT % SALT | FRACT VP RED'N AT 100°C | THEO. VP RED'N (RAOULT) | ACTIVITY COEFFICIENT | OSMOTIC PRESS. ATM. | IDEAL NORMALIZED FLUX (27% NaCl =1.0) | VAPOR PRESSURE DIFF. FROM H2O kPa@25°C (3.169 kPa) |
|---|---|---|---|---|---|---|---|---|---|
| NaCl 58.5 | 0.50 | 1.00 | 2.8 | 0.02 | 0.02 | 1.13 | 27.63 | 0.08 | 0.06 |
| | 1.00 | 2.00 | 5.5 | 0.03 | 0.03 | 0.86 | 41.66 | 0.13 | 0.10 |
| | 2.00 | 4.00 | 10.5 | 0.07 | 0.07 | 1.04 | 99.25 | 0.29 | 0.22 |
| | 3.00 | 6.00 | 14.9 | 0.11 | 0.10 | 1.13 | 159.38 | 0.46 | 0.35 |
| | 4.00 | 8.00 | 19.0 | 0.15 | 0.13 | 1.19 | 222.27 | 0.63 | 0.48 |
| | 5.00 | 10.00 | 22.6 | 0.19 | 0.15 | 1.25 | 288.20 | 0.79 | 0.60 |
| | 6.00 | 12.00 | 26.0 | 0.23 | 0.18 | 1.29 | 357.46 | 0.96 | 0.73 |
| | 8.00 | 16.00 | 31.9 | 0.27 | 0.22 | 1.21 | 430.42 | 1.13 | 0.86 |
| | 10.00 | 20.00 | 36.9 | 0.35 | 0.26 | 1.32 | 589.17 | 1.46 | 1.11 |
| CoCl2 111 | 0.50 | 1.50 | 5.3 | 0.02 | 0.03 | 0.76 | 27.63 | 0.08 | 0.06 |
| | 1.00 | 3.00 | 10.0 | 0.05 | 0.05 | 0.98 | 70.15 | 0.21 | 0.16 |
| | 2.00 | 6.00 | 18.2 | 0.13 | 0.10 | 1.33 | 190.46 | 0.54 | 0.41 |
| | 3.00 | 9.00 | 25.0 | 0.22 | 0.14 | 1.58 | 339.81 | 0.92 | 0.70 |
| | 4.00 | 12.00 | 30.7 | 0.32 | 0.18 | 1.80 | 527.46 | 1.33 | 1.01 |
| | 5.00 | 15.00 | 35.7 | 0.42 | 0.21 | 1.98 | 745.01 | 1.75 | 1.33 |
| | 6.00 | 18.00 | 40.0 | 0.50 | 0.24 | 2.04 | 947.99 | 2.08 | 1.58 |
| | 8.00 | 24.00 | 47.0 | 0.64 | 0.30 | 2.12 | 1397.28 | 2.67 | 2.03 |
| | 10.00 | 30.00 | 52.6 | 0.76 | 0.35 | 2.17 | 1951.82 | 3.17 | 2.41 |

FIG.3c

THERMODYNAMIC PROPERTIES OF SOLUTIONS OF SELECTED SALTS

| SALT (MW) | MOLALITY GMol/Kg H2O | OSMOLALITY GMol/Kg H2O | WT % SALT | FRACT VP RED'N AT 100°C | THEO. VP RED'N (RAOULT) | ACTIVITY COEFFICIENT | OSMOTIC PRESS. ATM. | IDEAL NORMALIZED FLUX (27% NaCl =1.0) | VAPOR PRESSURE DIFF. FROM H2O kPa@25°C (3.169 kPa) |
|---|---|---|---|---|---|---|---|---|---|
| MgCl2 95 | 0.50 | 1.50 | 4.5 | 0.02 | 0.03 | 0.76 | 27.63 | 0.08 | 0.06 |
| | 1.00 | 3.00 | 8.7 | 0.05 | 0.05 | 0.98 | 70.15 | 0.21 | 0.16 |
| | 2.00 | 6.00 | 16.0 | 0.13 | 0.10 | 1.33 | 190.46 | 0.54 | 0.41 |
| | 3.00 | 9.00 | 22.2 | 0.24 | 0.14 | 1.72 | 375.34 | 1.00 | 0.76 |
| | 4.00 | 12.00 | 27.6 | 0.36 | 0.18 | 2.03 | 610.37 | 1.50 | 1.14 |
| | 5.00 | 15.00 | 32.3 | 0.50 | 0.21 | 2.35 | 947.99 | 2.08 | 1.58 |
| | 6.00 | 18.00 | 36.4 | 0.66 | 0.24 | 2.70 | 1475.45 | 2.75 | 2.09 |
| KH2PO4 136 | 0.20 | 0.40 | 2.6 | 0.01 | 0.01 | 1.00 | 19.41 | 0.06 | 0.04 |
| | 0.40 | 0.80 | 5.2 | 0.02 | 0.01 | 1.00 | 28.81 | 0.09 | 0.07 |
| | 0.60 | 1.20 | 7.5 | 0.03 | 0.02 | 0.99 | 38.00 | 0.11 | 0.09 |
| | 0.80 | 1.60 | 9.8 | 0.03 | 0.03 | 0.99 | 46.99 | 0.14 | 0.11 |
| | 1.00 | 2.00 | 12.0 | 0.04 | 0.03 | 0.99 | 55.79 | 0.17 | 0.13 |
| | 1.20 | 2.40 | 14.0 | 0.05 | 0.04 | 0.99 | 64.40 | 0.19 | 0.15 |
| | 1.40 | 2.80 | 16.0 | 0.05 | 0.05 | 0.98 | 72.82 | 0.22 | 0.16 |
| | 1.60 | 3.20 | 17.9 | 0.06 | 0.05 | 0.98 | 82.79 | 0.24 | 0.19 |
| | 1.84 | 3.68 | 20.0 | 0.08 | 0.06 | 0.98 | 114.04 | 0.33 | 0.25 |

FIG.3d

THERMODYNAMIC PROPERTIES OF SOLUTIONS OF SELECTED SALTS

| SALT (MW) | MOLALITY GMol/Kg H2O | OSMOLALITY GMol/Kg H2O | WT % SALT | FRACT VP RED'N AT 100°C | THEO. VP RED'N (RAOULT) | ACTIVITY COEFFICIENT | OSMOTIC PRESS. ATM. | IDEAL NORMALIZED FLUX (27% NaCl =1.0) | VAPOR PRESSURE DIFF. FROM H2O kPa@25°C (3.169 kPa) |
|---|---|---|---|---|---|---|---|---|---|
| K2HPO4 174 | 1.00 | 3.00 | 14.8 | 0.05 | 0.05 | 1.00 | 73.80 | 0.22 | 0.17 |
| | 2.00 | 6.00 | 25.8 | 0.10 | 0.10 | 1.00 | 144.00 | 0.42 | 0.32 |
| | 4.00 | 12.00 | 41.0 | 0.18 | 0.18 | 0.99 | 274.95 | 0.76 | 0.58 |
| | 6.00 | 18.00 | 51.1 | 0.25 | 0.24 | 0.99 | 395.09 | 1.05 | 0.80 |
| | 8.00 | 24.00 | 58.2 | 0.31 | 0.30 | 0.99 | 506.10 | 1.29 | 0.98 |
| | 10.00 | 30.00 | 63.5 | 0.36 | 0.35 | 0.99 | 609.32 | 1.50 | 1.14 |
| | 11.00 | 33.00 | 65.7 | 0.38 | 0.37 | 0.98 | 658.35 | 1.59 | 1.21 |
| | 12.00 | 36.00 | 67.6 | 0.40 | 0.39 | 0.98 | 705.81 | 1.68 | 1.28 |
| | 13.00 | 39.00 | 69.3 | 0.42 | 0.41 | 0.98 | 751.80 | 1.76 | 1.34 |
| | 14.66 | 43.98 | 71.8 | 0.46 | 0.44 | 0.98 | 842.74 | 1.92 | 1.46 |
| K3PO4 212 | 0.50 | 2.00 | 9.6 | 0.02 | 0.03 | 1.01 | 33.64 | 0.10 | 0.08 |
| | 1.00 | 4.00 | 17.5 | 0.05 | 0.07 | 1.02 | 65.79 | 0.20 | 0.15 |
| | 1.50 | 6.00 | 24.1 | 0.07 | 0.10 | 1.03 | 96.55 | 0.28 | 0.22 |
| | 2.00 | 8.00 | 29.8 | 0.09 | 0.13 | 1.04 | 126.01 | 0.37 | 0.28 |
| | 2.50 | 10.00 | 34.6 | 0.11 | 0.15 | 1.05 | 154.27 | 0.44 | 0.34 |
| | 3.00 | 12.00 | 38.9 | 0.12 | 0.18 | 1.06 | 181.39 | 0.52 | 0.39 |
| | 3.50 | 14.00 | 42.6 | 0.14 | 0.20 | 1.08 | 207.46 | 0.59 | 0.45 |
| | 4.00 | 16.00 | 45.9 | 0.16 | 0.22 | 1.09 | 232.54 | 0.65 | 0.50 |
| | 4.50 | 18.00 | 48.8 | 0.17 | 0.24 | 1.10 | 256.68 | 0.71 | 0.54 |
| | 5.08 | 20.32 | 51.9 | 0.19 | 0.27 | 1.11 | 288.20 | 0.79 | 0.60 |

FIG. 3e

THERMODYNAMIC PROPERTIES OF SOLUTIONS OF SELECTED SALTS

| SALT (MW) | MOLALITY GMol/Kg H2O | OSMOLALITY GMol/Kg H2O | WT % SALT | FRACT VP RED'N AT 100°C | THEO. VP RED'N (RAOULT) | ACTIVITY COEFFICIENT | OSMOTIC PRESS. ATM. | IDEAL NORMALIZED FLUX (27% NaCl =1.0) | VAPOR PRESSURE DIFF FROM H2O kPa@25°C (3.169 kPa) |
|---|---|---|---|---|---|---|---|---|---|
| KH3P2O7 216 | 1.00 | 2.00 | 17.8 | 0.03 | 0.03 | 1.00 | 44.90 | 0.13 | 0.10 |
|  | 2.00 | 4.00 | 30.2 | 0.06 | 0.07 | 1.01 | 88.16 | 0.26 | 0.20 |
|  | 3.00 | 6.00 | 39.3 | 0.09 | 0.10 | 1.01 | 129.88 | 0.38 | 0.29 |
|  | 4.00 | 8.00 | 46.4 | 0.12 | 0.13 | 1.01 | 170.17 | 0.49 | 0.37 |
|  | 5.00 | 10.00 | 51.9 | 0.14 | 0.15 | 1.01 | 209.11 | 0.59 | 0.45 |
|  | 6.00 | 12.00 | 56.4 | 0.17 | 0.18 | 1.02 | 246.78 | 0.69 | 0.52 |
|  | 7.00 | 14.00 | 60.2 | 0.19 | 0.20 | 1.02 | 283.27 | 0.78 | 0.59 |
|  | 8.00 | 16.00 | 63.3 | 0.21 | 0.22 | 1.02 | 318.63 | 0.87 | 0.66 |
|  | 9.00 | 18.00 | 66.0 | 0.23 | 0.24 | 1.02 | 352.93 | 0.95 | 0.72 |
|  | 10.00 | 20.00 | 68.4 | 0.25 | 0.26 | 1.03 | 386.23 | 1.03 | 0.78 |
|  | 11.81 | 23.62 | 71.8 | 0.28 | 0.30 | 1.03 | 449.28 | 1.17 | 0.89 |
| K2H2P2O7 254 | 0.50 | 1.50 | 11.3 | 0.03 | 0.03 | 1.00 | 37.75 | 0.11 | 0.09 |
|  | 1.00 | 3.00 | 20.3 | 0.05 | 0.05 | 1.00 | 74.56 | 0.22 | 0.17 |
|  | 1.50 | 4.50 | 27.6 | 0.08 | 0.07 | 1.00 | 110.47 | 0.32 | 0.25 |
|  | 2.00 | 6.00 | 33.7 | 0.10 | 0.10 | 1.00 | 145.53 | 0.42 | 0.32 |
|  | 2.50 | 7.50 | 38.8 | 0.12 | 0.12 | 1.00 | 179.78 | 0.51 | 0.39 |
|  | 3.00 | 9.00 | 43.2 | 0.14 | 0.14 | 0.99 | 213.26 | 0.60 | 0.46 |
|  | 3.50 | 10.50 | 47.1 | 0.16 | 0.16 | 0.99 | 246.00 | 0.69 | 0.52 |
|  | 4.00 | 12.00 | 50.4 | 0.18 | 0.18 | 0.99 | 278.03 | 0.77 | 0.58 |
|  | 4.50 | 13.50 | 53.3 | 0.20 | 0.20 | 0.99 | 309.39 | 0.84 | 0.64 |
|  | 5.20 | 15.60 | 56.9 | 0.23 | 0.22 | 0.99 | 357.46 | 0.96 | 0.73 |

FIG.3f

THERMODYNAMIC PROPERTIES OF SOLUTIONS OF SELECTED SALTS

| SALT (MW) | MOLALITY GMol/Kg H2O | OSMOLALITY GMol/Kg H2O | WT % SALT | FRACT VP RED'N AT 100°C | THEO. VP RED'N (RAOULT) | ACTIVITY COEFFICIENT | OSMOTIC PRESS. ATM. | IDEAL NORMALIZED FLUX (27% NaCl =1.0) | VAPOR PRESSURE DIFF. FROM H2O kPa@25°C (3.169 kPa) |
|---|---|---|---|---|---|---|---|---|---|
| K3HP2O7 292 | 0.50 | 2.00 | 12.7 | 0.03 | 0.03 | 1.00 | 43.86 | 0.13 | 0.10 |
| | 1.00 | 4.00 | 22.6 | 0.06 | 0.07 | 1.01 | 86.09 | 0.25 | 0.19 |
| | 1.50 | 6.00 | 30.5 | 0.09 | 0.10 | 1.01 | 126.79 | 0.37 | 0.28 |
| | 2.00 | 8.00 | 36.9 | 0.11 | 0.13 | 1.01 | 166.06 | 0.48 | 0.36 |
| | 2.50 | 10.00 | 42.2 | 0.14 | 0.15 | 1.02 | 203.98 | 0.58 | 0.44 |
| | 3.00 | 12.00 | 46.7 | 0.16 | 0.18 | 1.02 | 240.65 | 0.67 | 0.51 |
| | 3.50 | 14.00 | 50.5 | 0.18 | 0.20 | 1.02 | 276.14 | 0.76 | 0.58 |
| | 4.00 | 16.00 | 53.9 | 0.20 | 0.22 | 1.03 | 310.50 | 0.85 | 0.64 |
| | 4.50 | 18.00 | 56.8 | 0.22 | 0.24 | 1.03 | 343.81 | 0.93 | 0.70 |
| | 5.00 | 20.00 | 59.3 | 0.24 | 0.26 | 1.03 | 376.13 | 1.00 | 0.76 |
| | 5.50 | 22.00 | 61.6 | 0.26 | 0.28 | 1.04 | 407.50 | 1.07 | 0.82 |
| | 6.06 | 24.24 | 63.9 | 0.27 | 0.30 | 1.04 | 430.42 | 1.13 | 0.86 |

FIG.3g

THERMODYNAMIC PROPERTIES OF SOLUTIONS OF SELECTED SALTS

| SALT (MW) | MOLALITY GMol/Kg H2O | OSMOLALITY GMol/Kg H2O | WT % SALT | FRACT VP RED'N AT 100°C | THEO. VP RED'N (RAOULT) | ACTIVITY COEFFICIENT | OSMOTIC PRESS. ATM. | IDEAL NORMALIZED FLUX (27% NaCl =1.0) | VAPOR PRESSURE DIFF. FROM H2O kPa@25°C (3.169 kPa) |
|---|---|---|---|---|---|---|---|---|---|
| K4P2O7 330 | 1.00 | 5.00 | 24.8 | 0.10 | 0.08 | 0.99 | 137.04 | 0.40 | 0.30 |
| | 1.50 | 7.50 | 33.1 | 0.14 | 0.12 | 0.98 | 202.07 | 0.57 | 0.44 |
| | 2.00 | 10.00 | 39.8 | 0.18 | 0.15 | 0.97 | 265.01 | 0.73 | 0.56 |
| | 2.50 | 12.50 | 45.2 | 0.21 | 0.18 | 0.97 | 326.02 | 0.88 | 0.67 |
| | 3.00 | 15.00 | 49.7 | 0.25 | 0.21 | 0.96 | 385.27 | 1.02 | 0.78 |
| | 3.50 | 17.50 | 53.6 | 0.28 | 0.24 | 0.95 | 442.87 | 1.15 | 0.88 |
| | 4.00 | 20.00 | 56.9 | 0.31 | 0.26 | 0.94 | 498.93 | 1.27 | 0.97 |
| | 4.50 | 22.50 | 59.8 | 0.33 | 0.29 | 0.94 | 553.58 | 1.39 | 1.05 |
| | 5.00 | 25.00 | 62.3 | 0.36 | 0.31 | 0.93 | 606.90 | 1.49 | 1.14 |
| | 5.50 | 27.50 | 64.5 | 0.38 | 0.33 | 0.92 | 658.97 | 1.59 | 1.21 |
| | 6.00 | 30.00 | 66.4 | 0.40 | 0.35 | 0.92 | 709.88 | 1.69 | 1.28 |
| | 6.50 | 32.50 | 68.2 | 0.43 | 0.37 | 0.91 | 759.71 | 1.78 | 1.35 |
| | 7.18 | 35.90 | 70.3 | 0.45 | 0.39 | 0.90 | 817.64 | 1.88 | 1.43 |

FIG.3h

FIGURE 7a: Corrosion-Pit Statistics on Stainless Steel 304

| Brine | N° pits/cm² | Av. pit diameter ($\mu$m) |
|---|---|---|
| $K_2HPO_4$ | 470 | 19 |
| $K_4P_2O_7$ | 310 | 24 |
| NaCl | 2360 | 48 |
| $K_2HPO_4/H_3PO_4$ | 160 | 29 |
| $K_4P_2O_4/H_4P_2O_7$ | 470 | 22 |
| $CH_3COOK$ | 470 | 40 |
| $CaCl_2$ | 1570 | 46 |
| $K_2HPO_4KH_2PO_4$ | 630 | 22 |

Figure 7b: Corrosion-Pit Statistics on Stainless Steel 316

| Brine | N° pits/cm² | Av. pit diameter ($\mu$m) |
|---|---|---|
| $K_2HPO_4$ | 160 | 48 |
| $K_4P_2O_7$ | 310 | 24 |
| NaCl | 2040 | 37 |
| $K_2HPO_4/H_3PO_4$ | 310 | 29 |
| $K_4P_2O_7/H_4P_2O_7$ | 160 | 38 |
| $CH_3COOK$ | 310 | 62 |
| $CaCl_2$ | 1260 | 48 |
| $K_3HPO_4/KH_2PO_2$ | 470 | 38 |

METHODS AND APPARATUS FOR OSMOTIC DISTILLATION

FIELD OF THE INVENTION

This invention relates to novel osmotic distillation methods and apparatus employing aqueous salt solutions as dehydrating agents, and, more particularly, to osmotic distillation methods and apparatus employing dehydrating aqueous solutions of potassium salts of phosphoric acid, pyrophosphoric acid, and blends thereof. In another preferred embodiment, the invention relates to methods for the simultaneous osmotic distillation and removal of carbon dioxide from a sample of relatively low osmotic pressure employing alkaline potassium orthophosphate and pyrophosphate dehydrating solutions.

BACKGROUND OF THE INVENTION

Osmotic distillation is a novel membrane process that facilitates the concentration of aqueous solutions under mild operating conditions. See U.S. Pat. No. 4,781,837 to Lefebvre. Osmotic distillation is ideally suited to the concentration of liquid foods, such as fruit and vegetable juices, because the formation of heat degradation products and the loss of volatile flavor and/or fragrance components associated with conventional thermal evaporation devices are largely avoided. The process is also ideally suited to the concentration of aqueous solutions of thermally labile pharmaceutical and biological products (e.g., antibiotics, vaccines) or other water-soluble compounds, where thermal degradation may cause loss in desired activity, generation of toxic decomposition products, discoloration, or other undesired effects.

In the osmotic distillation process, two aqueous solutions of differing water vapor pressures are in contact with but are separated by a hydrophobic microporous membrane into which neither solution will spontaneously penetrate at the operating pressure. The vapor pressure difference between the solutions creates a driving force for vapor transport across the membrane, from the solution to be dehydrated (the "feed" solution) into a dehydrating solution (the "strip" solution) of lower initial water vapor pressure. Salts of high water solubility and low equivalent weight are preferred as strip solution solutes.

In addition to the ability to lower water vapor pressure to a sufficient degree, strip solution solutes should possess other properties to ensure their safe, effective, and economic use as water-extracting solutions in osmotic distillation. These other properties are particularly important for the osmotic distillation of liquid foodstuffs, beverages, pharmaceutical and biological products, and thermally unstable chemicals. Generally, these properties include:

a) The salts should be chemically stable in solution at all temperatures to which they are likely to be exposed, both during the osmotic distillation process, and at the elevated temperatures to which they will be exposed during their evaporative reconcentration prior to reuse;

b) The salts (or any of their products of hydrolysis in solution under conditions of use) must be non-wetting to the hydrophobic microporous membrane, and non-destructive to the membrane at concentrations up to saturation;

c) The salts (or any of their products of hydrolysis in solution under conditions of use) must be non-volatile at all temperatures to which the solution may be subjected;

d) The salts (or any of their products of hydrolysis in solution under conditions of use) must be nontoxic to either humans or animals at concentrations in solution which are likely to be encountered should cross-contamination of feed and strip solutions occur, and preferably at higher concentrations;

e) The salts (or any of their products of hydrolysis in solution under conditions of use) must be devoid of detectable taste or smell in aqueous solution at concentrations which are likely to be encountered should cross-contamination of feed and strip solutions occur, and preferably at higher concentrations;

f) Concentrated aqueous solutions of such salts must be incapable of reacting with volatile components of feed solutions to be concentrated to yield insoluble precipitates, which could obstruct or promote liquid wet-out of the pores of the microporous membrane;

g) Concentrated aqueous solutions of such salts, at the temperatures to be encountered in osmotic concentration or their evaporative reconcentration, must be non-corrosive towards the materials of construction of all process equipment with which they come into contact;

h) Preferably, the salt should exhibit a large positive temperature coefficient of solubility in aqueous solution. This is desirable to allow maximum removal of water from the solution during the evaporative reconcentration process while minimizing the possibility of crystallization of the salt from solution during that process; and i) Preferably, the salt should be commercially available in large quantities and at low cost.

Several salts have been employed as strip solution solutes. U.S. pat. No. 4,781,837, to Lefebvre describes methods of performing osmotic distillation using $MgSO_4$ or $NaCl$ strip solutions. U.S. pat. No. 5,382,365 to Deblay describes osmotic distillation using $CaCl_2$ or $MgCl_2$ strip solutions. While these are salts of high water solubility and low equivalent weight, they are halides and/or contain alkali or alkaline earth metal ions, and thus do not possess the essential properties specified above.

Sodium chloride has been shown to be unable to reduce the vapor pressure of an aqueous solution to a point sufficient for optimal use in osmotic distillation. This salt has a minimum water activity in excess of 0.7 at saturation at ambient temperature. This places practical limitations on the target concentration of the feed. Additionally, NaCl does not have a large positive temperature coefficient of solubility in aqueous solution. Further, halide salts generally have the disadvantage of being highly corrosive to many common materials of construction. NaCl also has a detectable taste in aqueous solution at concentrations which could possibly arise in concentrated feeds via contamination through the hydrophobic membrane (possibly 10 PPM or greater).

Salts containing calcium and magnesium also suffer from the disadvantages of being detectable by taste, and of having corrosive properties of halide salts. Salts containing calcium and magnesium also have the additional risk of the formation of insoluble precipitates, particularly with compounds commonly found in process water or liquid food products such as carbon dioxide, sulfate, fluoride, and phosphates. Low cost technical grades of these salts (both $CaCl_2$ and $MgCl_2$) are commonly available but are generally of insufficient purity to assure absence of objectionable metal ion contaminants (e.g., iron) and/or insoluble salts. High purity grades, such as British Pharmaceutical, are too expensive to be of practical use.

Magnesium sulfate, like sodium chloride, does not reduce the water activity to a sufficient degree to be of practical value. The water activity of this salt at saturation is in excess of 0.8. While its solutions are less corrosive toward ferrous alloys than are those of halide salts, its acidity renders it mildly corrosive at elevated temperature. It also forms precipitates with ions present in many feed solutions, including carbonate, fluoride, and phosphate ions.

Thus, it would be of great advantage to have strip solutions for osmotic distillation which do not suffer from the disadvantages listed above. This invention is directed to this important end.

OBJECTS OF THE INVENTION

It is one object of the present invention to provide osmotic distillation methods employing dehydrating solutions that substantially overcome the technical disadvantages associated with currently available dehydrating solutions.

It is another object of the present invention to provide osmotic distillation methods employing dehydrating solutions that are chemically stable, non-wetting, non-volatile, non-toxic, odorless and tasteless.

It is a further object of the invention to provide osmotic distillation methods employing strip solutions which are substantially incapable of reacting with volatile components of feed solutions to form insoluble precipitates.

It is a further object of the invention to provide osmotic distillation methods employing strip solutions which are substantially non-corrosive towards the materials of construction of process equipment and which possess a large positive temperature coefficient of solubility in aqueous solution.

It is a further object of the invention to provide osmotic distillation methods employing strip solutions consisting of aqueous solutions of salts which are commercially available in large quantities and at low cost.

It is a further object of the invention to provide methods for simultaneous osmotic distillation and removal of carbon dioxide.

It is a further object of the invention to provide apparatus for the practice of the methods of the invention.

SUMMARY OF THE INVENTION

These and other objects are satisfied by the present invention, which provides novel methods and apparatus for osmotic distillation.

In certain embodiments, the present invention provides methods of osmotic distillation for the concentration of a sample of relatively low osmotic pressure comprising:

providing a sample to be concentrated having a first osmotic pressure;

providing a solution having a higher osmotic pressure than said sample, said solution comprising a saturated or near-saturated aqueous solution containing one or more nonhalide salts, wherein said salts are chemically stable at temperatures up to the normal boiling point of the saturated solution of said salts, non-toxic to humans and animals, odorless and tasteless in aqueous solution, substantially incapable of forming precipitates when exposed to volatile components of feed solutions to be concentrated, non-corrosive to process equipment, and has a large positive temperature coefficient of solubility in aqueous solution; and placing said sample and said solution on opposite sides of a hydrophobic microporous membrane.

In preferred embodiments the nonhalide salt is selected from the group consisting of tripotassium orthophosphate ($K_3PO_4$), potassium monohydrogen orthophosphate ($K_2HPO_4$), potassium dihydrogen orthophosphate ($KH_2PO_4$), tetrapotassium pyrophosphate ($K_4P_2O_7$), tripotassium monohydrogen pyrophosphate ($K_3HP_2O_7$), dipotassium dihydrogen pyrophosphate ($K_2H_2P_2O_7$), or monopotassium trihydrogen pyrophosphate ($KH_3P_2O_7$), potassium acetate, and blends thereof.

In some preferred embodiments the sample to be concentrated is a liquid foodstuff, preferably a fruit juice, a vegetable juice, a liquid dairy product (e.g., milk, cheese whey), or a plant- or animal-extract (e.g., sugar beet extract, coffee, tea, beef broth, soya milk, and the like).

In other preferred embodiments the sample to be concentrated is a solution of a pharmaceutical or biological product, preferably a vaccine, an antibiotic, a peptide hormone such as insulin or human somatotropin, a regulatory peptide such as erythropostin, a vitamin such as cyanocobalamine, and the like.

Also provided in accordance with the present invention are methods for the simultaneous osmotic distillation and removal of carbon dioxide from a sample of relatively low osmotic pressure comprising:

providing a sample to be concentrated having a first osmotic pressure and containing dissolved carbon dioxide;

providing a solution having a higher osmotic pressure than said sample, said solution comprising an aqueous alkaline solution of a nonhalide salt, wherein said salt is selected from the group consisting of tripotassium orthophosphate, dipotassium hydrogen orthophosphate, tetrapotassium pyrophosphate, tripotassium hydrogen pyrophosphate, potassium acetate, and blends thereof; and placing said sample and said solution on opposite ides of a hydrophobic microporous membrane.

Also provided in accordance with the present invention are osmotic distillation apparatus comprising a hydrophobic microporous membrane having opposing surfaces; a sample to be concentrated contacting one of said surfaces; and a strip solution contacting the other of said surfaces, said strip solution comprising a saturated or near saturated solution of an aqueous salt selected from the group consisting of tripotassium orthophosphate ($K_3PO_4$), potassium monohydrogen orthophosphate ($K_2HPO_4$), potassium dihydrogen orthophosphate ($KH_2PO_4$), tetrapotassium pyrophosphate ($K_4P_2O_7$), tripotassium monohydrogen pyrophosphate ($K_3HP_2O_7$), dipotassium dihydrogen pyrophosphate ($K_2H_2P_2O_7$), or monopotassium trihydrogen pyrophosphate ($KH_3P_2O_7$), potassium acetate, and blends thereof.

BRIEF DESCRIPTION OF THE DRAWINGS

The numerous objects and advantages of the present invention may be better understood by those skilled in the art by reference to the accompanying figures, in which:

FIG. 2 shows the relationship between solubility and temperature for solutions of several salts of the invention.

FIGS. 3a and 3b show further solubility properties of the salts of FIG. 2.

FIG. 3c–3h shows thermodynamic properties of selected salts.

FIG. 7a and FIG. 7b shows the results of studies of corrosion of stainless steel 304 and 316 when exposed to brines of the present invention and representative halide salt brines.

DETAILED DESCRIPTION OF THE INVENTION

This invention provides novel osmotic distillation methods and apparatus for osmotic distillation. In one aspect the invention provides methods of osmotic distillation for the concentration of a sample of relatively low osmotic pressure comprising:

providing a sample to be concentrated having a first osmotic pressure;

providing a solution having a higher osmotic pressure than said sample, said solution comprising a saturated or near-saturated aqueous solution containing one or more nonhalide salts, wherein said salts are chemically stable at temperatures up to the normal boiling point of the saturated solution of said salts, non-toxic to humans and animals, odorless and tasteless in aqueous solution, substantially incapable of forming precipitates when exposed to volatile components of feed solutions to be concentrated, non-corrosive to process equipment, and has a large positive temperature coefficient of solubility in aqueous solution; and placing said sample and said solution on opposite sides of a hydrophobic microporous membrane.

It has been discovered that brines based on potassium acetate and potassium salts of orthophosphoric or pyrophosphoric acid, satisfy the foregoing criteria for safe, effective and economic use in osmotic distillation processes. Accordingly, in preferred embodiments the nonhalide salt is selected from one or more of tripotassium orthophosphate (K$_3$PO$_4$), potassium monohydrogen orthophosphate (K$_2$HPO$_4$), potassium dihydrogen orthophosphate (KH$_2$PO$_4$), tetrapotassium pyrophosphate (K$_4$P$_2$O$_7$), tripotassium monohydrogen pyrophosphate (K$_3$HP$_2$O$_7$), dipotassium dihydrogen pyrophosphate (K$_2$H$_2$P$_2$O$_7$), or monopotassium trihydrogen pyrophosphate (KH$_3$P$_2$O$_7$), wherein each of the foregoing salts are optionally used in combination with orthophosphoric acid (H$_3$PO$_4$) and/or pyrophosphoric acid (H$_4$P$_2$O$_7$), for control of pH and K/H ratio in solution. In other preferred embodiments the nonhalide salt is potassium acetate (KC$_2$H$_3$O$_2$).

Figure 1:
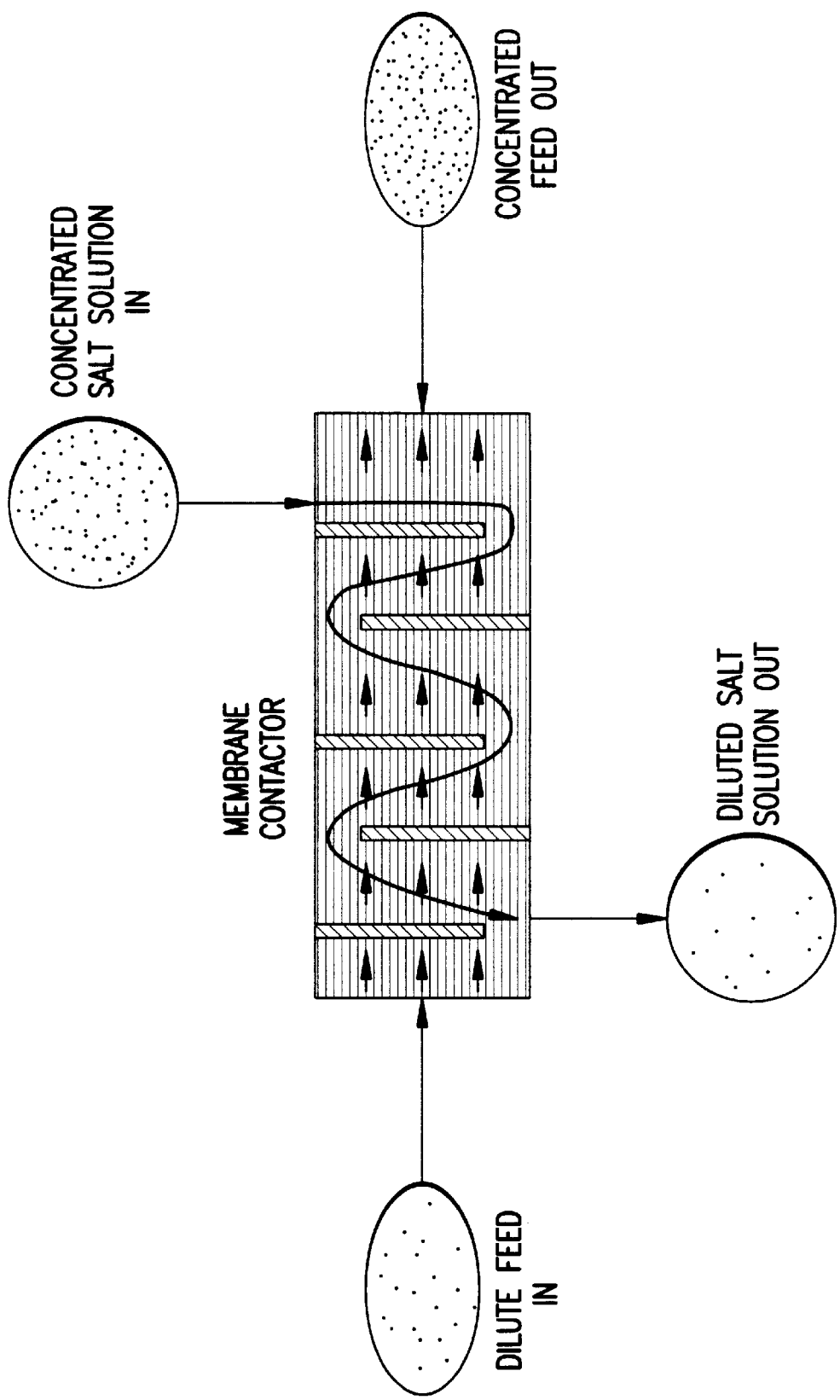
FIG. 1 is a basic illustration of the osmotic distillation process.
Figure 1A:
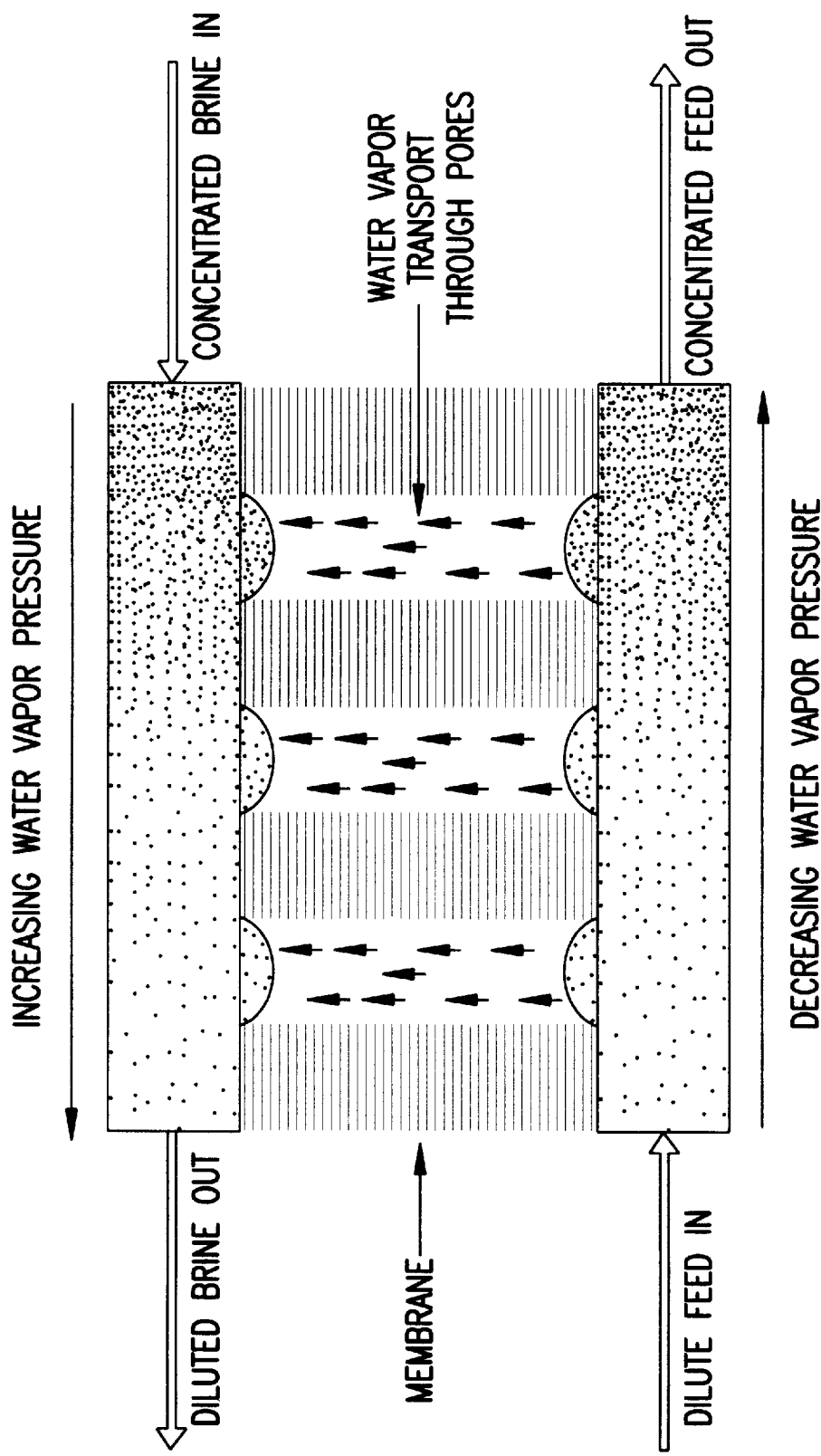
FIG. 1a shows the mechanism of osmotic concentration through a microporous, hydrophobic membrane.

FIGS. 1a and 1b show the basic principles and mechanisms of the osmotic distillation process. In this process, when a hydrophobic, microporous membrane separates the two liquid phases. water evaporates from the surface of (and thereby concentrates) the solution with the higher vapor pressure, passes through the pores of the membrane as a vapor, and condenses on the surface of (and thereby dilutes) the solution of lower vapor pressure. The solution being concentrated is referred to as the "feed" solution, and the solution receiving the water vapor is referred to as the "strip" solution.

The vapor pressure of the strip solution must be kept below that of the feed for vapor transport from feed to strip solution to occur. This is achieved by employing a suitably concentrated solution of a non-volatile solute as the strip solution. Any water-soluble, non-volatile solute, when dissolved in water, will reduce the vapor pressure of water over the solution to a value below that of pure water at the same temperature. For any given solute, the vapor pressure of water over its solutions continuously decreases as the solute concentration increases, up to the limit of its solubility. The ability of a solute to depress the vapor pressure of water over its solutions is not only dependent on its mass-concentration (e.g., grams per liter of solution), but also upon the number of independent particles which are generated in solution per unit mass of dissolved solute. For simple solutes (e.g., sucrose), this is determined by the molecular weight (or gram formula weight) of the solute. It is thus the molar concentration of such solute (that is, its mass concentration divided by its molecular weight) that principally determines its ability to depress the vapor pressure of water over its solutions. It can be seen that the higher the limit of solubility of the solute in water, and the lower its molecular weight, the more satisfactory will be the solutions for removing water by osmotic distillation.

If the solute in question is not a simple molecular compound, and can dissociate and ionize into two or more independent ions when dissolved in water (a property that is characteristic of most water-soluble salts), it will have greater ability to depress the vapor pressure of water than a nonionizing solute of similar gram-formula weight. For such solutes, this activity is determined not by the molecular weight of the compound, but rather by the "equivalent weight", which is the molecular weight divided by the number of independent ions formed in solution per mole of solute. Thus, for salts and other ionizing solutes, the capacity to depress the vapor pressure of water increases with increasing solubility, decreasing molecular weight, and increasing number of ions per mole in solution. It therefore can be seen that salts of high water solubility and low equivalent weight are preferred as stripping solution solutes in osmotic distillation. Concentrated solutions of such salts are commonly called "brines".

The salts employed in the present invention possess the properties necessary for safe, effective and economic use in osmotic distillation processes. Each salt is capable of lowering water activity to a sufficient degree to be of practical use as strip solution solutes.

FIG. 2 shows the relationship between solubility and temperature for tripotassium orthophosphate (K$_3$PO$_4$), potassium monohydrogen orthophosphate (K$_2$HPO$_4$), potassium dihydrogen orthophosphate (KH$_2$PO$_4$), tetrapotassium pyrophosphate (K$_4$P$_2$O$_7$), tripotassium monohydrogen pyrophosphate (K$_3$HP$_2$O$_7$), dipotassium dihydrogen pyrophosphate (K$_2$H$_2$P$_2$O$_7$), and monopotassium trihydrogen pyrophosphate (KH$_3$P$_2$O$_7$). In each case it can be seen that the solubility of the salt in water increases significantly with increasing temperature.

Figure 4:
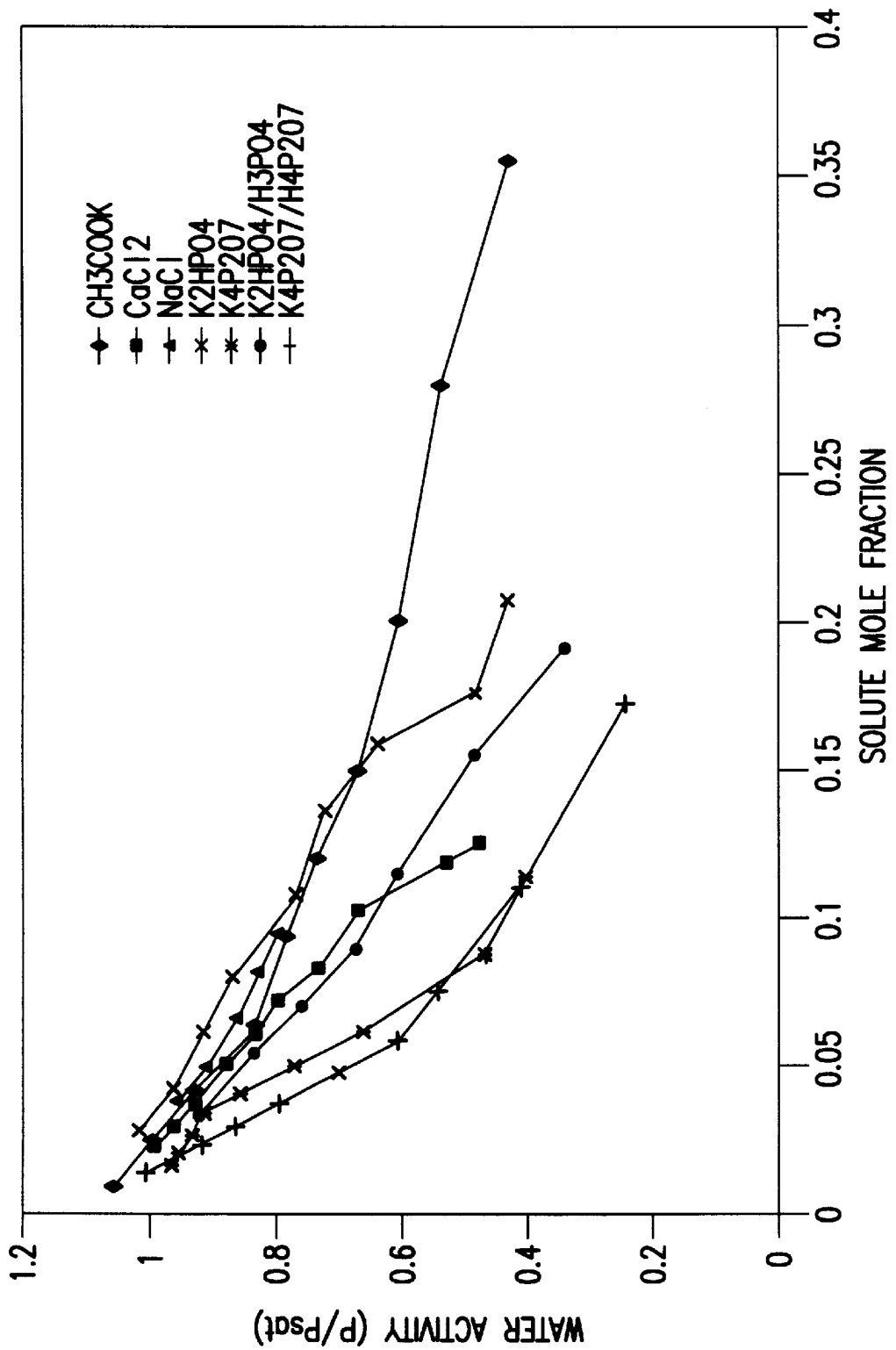
FIG. 4 shows the vapor pressure profiles for solutions of NaCl, CaCl$_2$, and several salts of the invention over a range of concentrations.

FIGS. 3a and 3b shows further solubility properties of the salts of FIG. 2. FIG. 4 shows the vapor pressure profiles for solutions of NaCl, CaCl$_2$, and several salts of the invention over a range of concentrations. It can be seen that the vapor pressure reduction achieved is sufficiently low to be of practical value, with the exception of sodium chloride. The lowest water activities are achieved in solutions containing mixtures of tetrapotassium pyrophosphate and pyrophosphoric acid (that is, potassium pyrophosphate solutions in which the potassium to pyrophosphate ratio is less than two).

Figure 5:
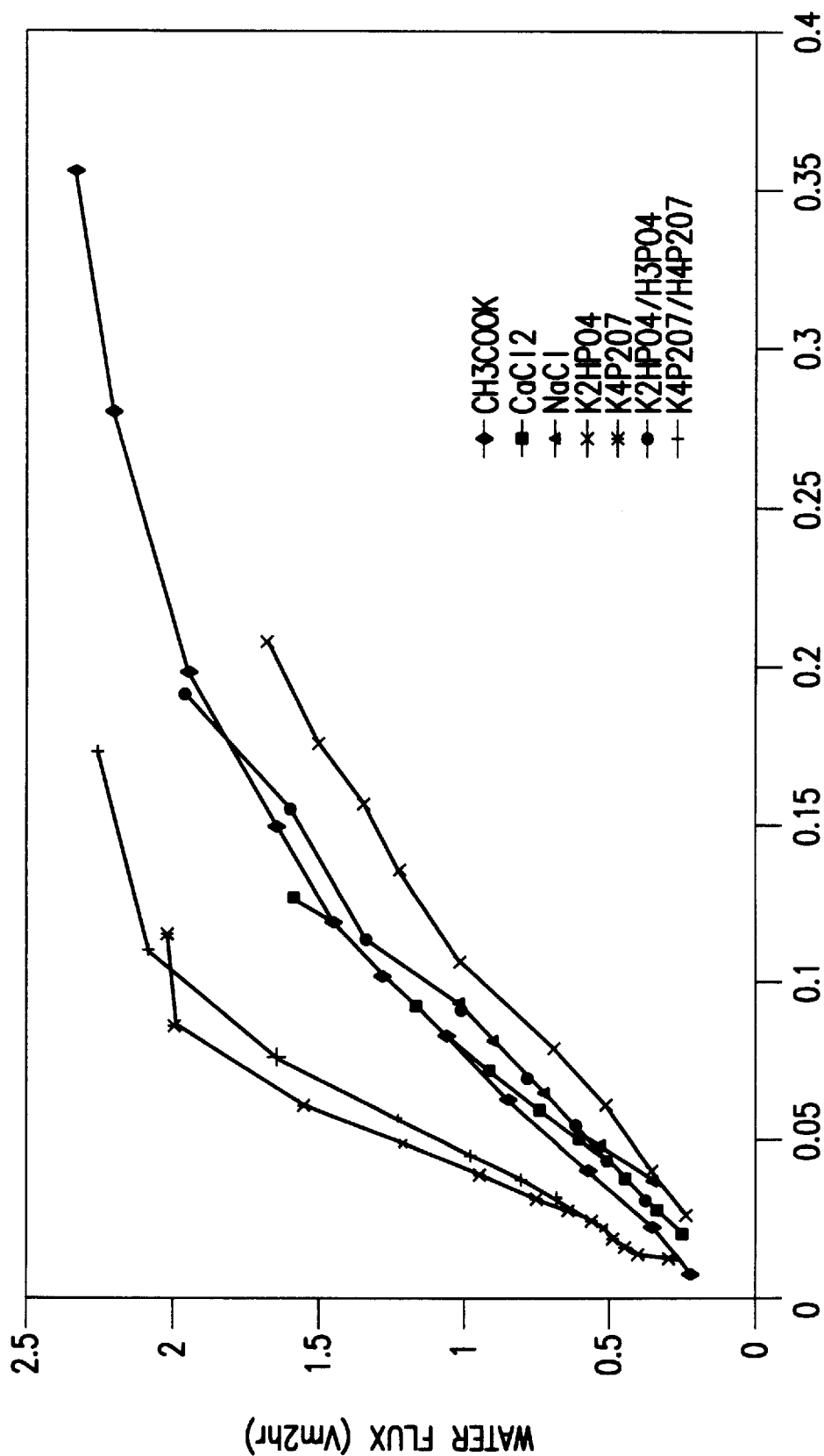
FIG. 5 shows water flux versus solute mole fraction for the solutions of FIG. 4.

FIG. 5 shows water flux data obtained using a Celgard 2500 membrane (a microporous polypropylene membrane manufactured by Hoechst Celanese Separations Products Division, Charlotte, N.C.), and pure water as the feed liquid, under identical experimental conditions. From these data it can be seen that water flux at a given mole fraction of orthophosphate or pyrophosphate salt compares favorably with or is superior to halide salts. This is in accordance with the general principle that solutions achieving the lowest water activity will produce the highest water flux values.

Figure 6:
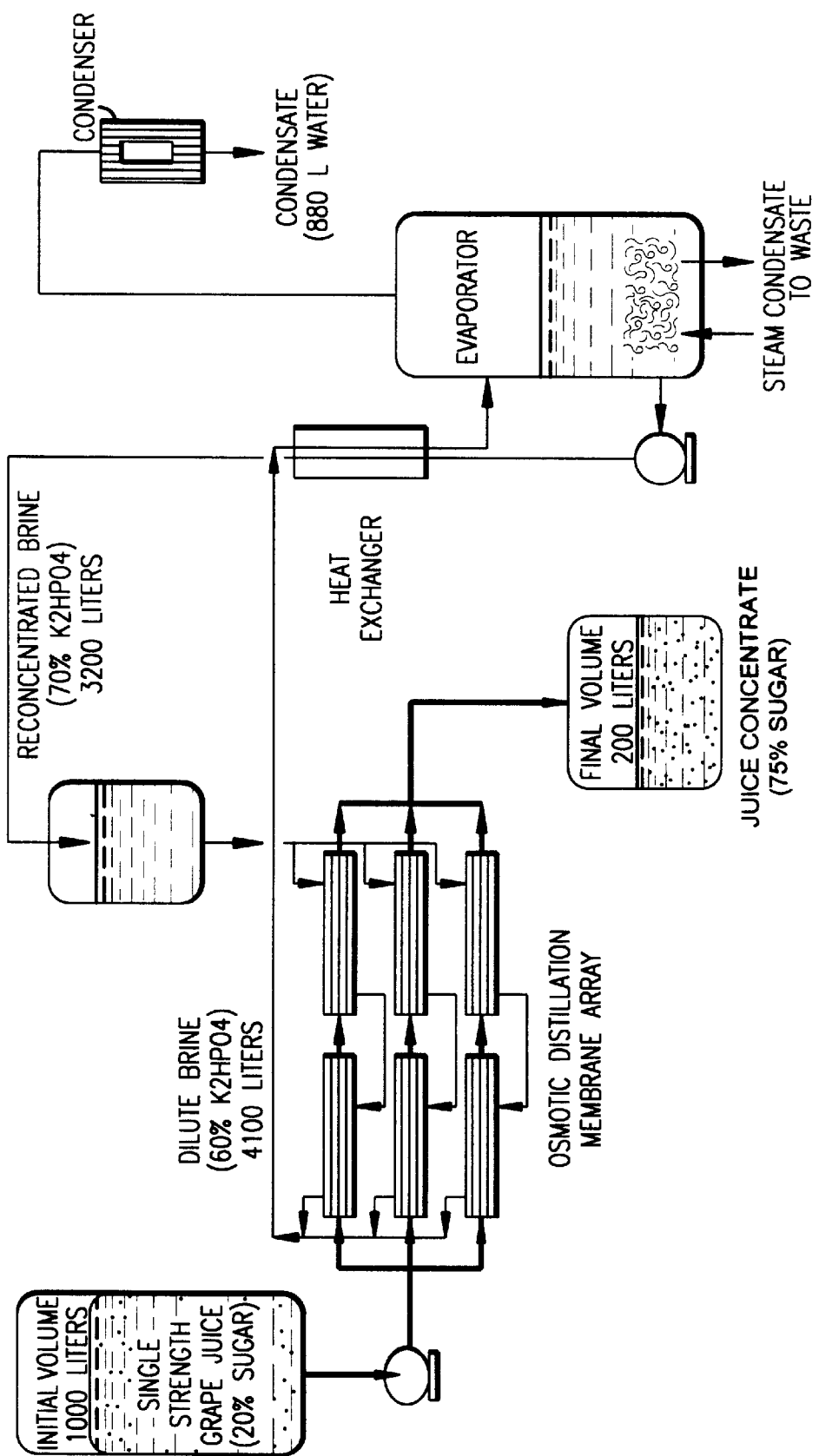
FIG. 6 is an illustration of an osmotic distillation semi-batch process.

During osmotic distillation, the water removed from the feed is absorbed by, and therefore dilutes, the brine phase. Once so diluted, the brine must be reconcentrated by water-removal prior to recycling and reuse. The simplest and most common process for concentrating a brine is thermal evaporation or boiling, wherein the solution is heated to its boiling point in a suitable still, water vapor or steam removed (and usually condensed to pure liquid water), and the remaining concentrated solution cooled and recycled. FIG. 6 shows such an osmotic distillation process. Feed solution and brine solution are simultaneously pumped from their respective tanks into the osmotic distillation apparatus, wherein the feed is concentrated and the brine is diluted. Either continuously or at appropriate intervals, the diluted brine is circulated through an evaporator wherein water is distilled and the brine reconcentrated for further use.

Thus, strip solution solutes should be chemically stable in solution at all temperatures to which they are likely to be exposed, both during the osmotic distillation process, and at the elevated temperatures to which they will be exposed during their evaporative reconcentration prior to reuse. In general, this requires salts to be stable up to about the boiling point of their saturated solutions. The potassium salts employed in the methods and apparatus of the present invention meet this criterion.

Osmotic distillation is dependent upon the passage of water through the microporous membrane in the vapor phase. Thus, it is important that the salts used as strip solution solutes (or any of their products of hydrolysis in solution under conditions of use) do not promote wetting of the membrane by the solution, leading to penetration of liquid into the pores of the membrane. Such wetting would allow direct communication between the feed and strip solutions across the membrane, thereby leading to cross contamination either of the sample to be concentrated, the strip solution, or both. As used herein the term "wetting" denotes a reduction in the angle-of-contact between the liquid and the membrane surface, thereby allowing imbibition of liquid into the membrane pores and flow of liquid water across the membrane under process conditions. Concentrated aqueous solutions of most water-soluble inorganic salts, such as the preferred salts of this invention, exhibit surface tensions significantly greater than those of pure water, and are thus less likely to wet out and penetrate the pores of hydrophobic microporous membranes than does pure water.

The orthophosphate, pyrophosphate and acetate salts employed in the brines of the present invention are substantially non-volatile at temperatures of process conditions. As used herein the term "substantially non-volatile" means that the salt will not volatilize and cross the membrane under the process conditions to a significant degree; i.e., to result in significant contamination of feed solutions with the salt, nor will they be vaporized and lost during the process of evaporative reconcentration as is required during osmotic distillation.

The salt components of the dehydrating solutions of the present invention have the advantage of being a normal component of foodstuffs, and of human and animal biological fluids. Thus, these salts are expected to be nontoxic to humans or animals at concentrations in solution which are likely to be encountered should cross-contamination of feed and strip solutions occur. Generally, such contamination will be exceedingly small, and will not exceed about 100 parts per million. It is of course preferable that for additional safety, the salts be nontoxic at significantly higher concentrations. The salts of the present invention meet these criteria. As used herein, the term "nontoxic" means that the salt can be safely ingested at the indicated concentration.

For osmotic distillation of foodstuffs such as, for example, fruit and vegetable juices, brine salts (or any of their products of hydrolysis in solution under conditions of use) should be tasteless and odorless to a human in aqueous solution at concentrations likely to be encountered in the event of cross-contamination of feed and strip solutions. Generally, under proper operating conditions, such contamination will be exceedingly small, and will not exceed about 25 PPM. It is of course preferable that the salt be odorless and tasteless at significantly higher concentrations. The potassium orthophosphate and pyrophosphate salts satisfy this requirement; for example, dipotassium monohydrogen orthophosphate is used at much higher concentrations than this as a sequestrant in non-dairy powdered coffee creams. (See entry No. 7647, p. 1216, The Merck Index, 11th Ed., 1989).

Concentrated aqueous solutions of suitable salts must be substantially incapable of reacting with any volatile components of feed solutions to be concentrated to yield insoluble precipitates. Such precipitates are likely to obstruct pores of the hydrophobic microporous membrane, or promote their liquid wet-out, leading to flow of liquid across the membrane. Typical volatile components likely to be present in liquid foodstuffs, fruit and vegetable juices and beverages include, carbon dioxide, sulphur dioxide, ammonia, organic acids, essential oils and the like. Thus, any components of a strip solution salt which can react with one or more of these components to yield an insoluble precipitate would render that salt unsuitable for use with such a feed. Inasmuch as the most likely sites for formation of a precipitate during osmotic distillation are at the surfaces of the membrane in immediate contact with the strip solution, and since even very small amounts of precipitate formed at such sites are likely to promote membrane wet-out, strip-solution salts containing ions capable of forming sparingly soluble compounds with any of the common volatile components likely to be found in most liquid foodstuffs or pharmaceutical solutions should be avoided. Such objectionable ions include the alkaline earth cations ($Ca^{++}$, $Mg^{++}$). Alkali metal cations such as potassium, and anions such as orthophosphate, pyrophosphate, and acetate, do not form insoluble compounds with such volatile solutes.

In a preferred embodiment of the invention, methods are provided for the simultaneous osmotic distillation and removal of carbon dioxide from a sample of relatively low osmotic pressure. The process comprises providing a sample to be concentrated having a first osmotic pressure and containing dissolved carbon dioxide; providing a solution having a higher osmotic pressure than said sample, said solution comprising an aqueous alkaline solution of a non-halide salt, wherein said salt is selected from the group consisting of tripotassium orthophosphate, dipotassium hydrogen orthophosphate, tetrapotassium pyrophosphate, tripotassium hydrogen pyrophosphate, potassium acetate, and blends thereof; and placing said sample and said solution on opposite sides of a hydrophobic microporous membrane. Using such an alkaline strip solution will, in addition to concentrating the feed, advantageously effect the removal of carbon dioxide via the formation of (highly water-soluble) potassium carbonate, and thus decrease the risk of formation of insoluble carbonate precipitates.

Components of food and pharmaceutical processing systems are normally constructed of several different types of materials, including plastics, glass, ceramics, and ferrous alloys such as stainless steels. Concentrated aqueous solutions of strip solution salts should be non-corrosive towards such materials of construction, at the temperatures to be encountered in osmotic concentration or their evaporative reconcentration. Preferably, the brine solutions should be non-corrosive toward ferrous alloys normally used to fabricate such equipment. As used herein, the term "non-corrosive" means substantially less corrosive than solutions of metal halide salts under identical conditions, as measured by the number of pits produced per square centimeter according to the procedure of Example 1. Preferably, substantially less corrosive brines of the invention produce 20% fewer pits per square centimeter, more preferably 40% fewer, and even more preferably 50% fewer pits per square centimeter. It is especially preferred that brines of the invention produce 60% fewer pits per square centimeter than halide brines. FIG. 7a shows the results of corrosion studies for stainless steel 304 when exposed to brines of the present invention and representative halide salt brines (NaCl and $CaCl_2$), according to the procedure of Example 1. FIG. 7b shows analogous data for stainless steel 316. It can be seen that the number of pits per square centimeter for both stainless steels are significantly lower for the brines of the invention when compared to halide salt brines.

The salts of the present invention exhibit large positive temperature coefficients of solubility in aqueous solution. This property allows maximum removal of water from the solution during the evaporative reconcentration process while minimizing the possibility of crystallization of the salt from solution during that process.

The salts employed in the brines of the present invention are also commercially available in large quantities at a relatively low cost. For example, the orthophosphate, pyrophosphate and acetate salts described herein may be purchased from suppliers to the food, drug, cosmetic, and detergent industries, including, for example, Monsanto Company, FMC Corporation, Dow Chemical Company, and E.I. DuPont de Nemours & Co.

The invention is further illustrated by way of the following examples which are intended to elucidate the invention. These examples are not intended, nor are they to be construed, as limiting the scope of the disclosure.

EXAMPLES

Example 1
Corrosion of Stainless Steels

The non-corrosivity of these salts is demonstrated in FIGS. 7a and 7b. These figures contain the results of trials conducted in accordance with ASTM standards G31 (Standard Practice for Laboratory Immersion Corrosion Testing of Metals) and G1 (Standard Practice for Preparing, Cleaning, and Evaluating Corrosion Test Materials) using stainless steel 304 and stainless steel 316 as test materials. The corrosion trials were conducted using circular coupons having a surface area of 8.6–8.8 $cm^2$, and a mass of 11.3–12.2 g, which were held at 96±2° C. for 453 hours.

The results indicate that the halide brines caused significantly greater numbers of pits per square centimeter than the brines according to the invention with both 304 and 316 stainless steels.

Example 2
Osmotic Distillation Method and Apparatus

The following is a representative example of the process of osmotic distillation for the concentration of a liquid foodstuff by the practice of the subject invention:

One thousand liters of a single strength, varietal (Chardonnay) grape juice, containing a sugar concentration of 20% by weight is to be osmotically concentrated to 75% sugar by weight. Such process requires the removal from the single-strength juice approximately 880 liters of water. The feed juice is fed continuously to a bank of membrane osmotic concentrators, with simultaneous continuous counterflow of a potassium monohydrogen orthophosphate ($K_2HPO_4$) brine containing 70% salt by weight. The juice feed rate to the membrane unit is adjusted to control the effluent juice concentrate sugar concentration to the desired 75%, while the brine strip feed rate is adjusted to maintain the dilute brine effluent concentration to 60% by weight. The diluted brine leaving the membrane unit is delivered to a steam-heated evaporator, where water is removed as vapor, condensed, and removed as pure water distillate, and the reconcentrated and cooled 70% brine returned to the osmotic distillation unit. Since 100 kg of 70% brine fed removes 17 kg water from the feed, the total weight of brine required for this concentration is about 5200 kg, or about 3200 liters. A flowsheet for this process is illustrated in FIG. 6.

Each of the patents, publications, and other published documents mentioned or referred to in this specification is herein incorporated by reference in its entirety.

As those skilled in the art will appreciate, numerous changes and modifications may be made to the preferred embodiments of the invention without departing from the spirit of the invention and the scope of the appended claims.

What is claimed is:

1. A method of osmotic distillation for the concentration of a sample of relatively low osmotic pressure comprising:
   providing a sample to be concentrated having first osmotic pressure;
   providing a solution having a higher osmotic pressure than said sample, said solution comprising a saturated or near-saturated aqueous solution containing one or more nonhalide salts, wherein said salts are chemically stable at temperatures up to the normal boiling point of the saturated solution of said salts, non-toxic to humans and animals, odorless and tasteless in aqueous solution, substantially incapable of forming precipitates when exposed to volatile components of feed solutions to be concentrated, non-corrosive to process equipment, and have large positive temperature coefficients of solubility in aqueous solution; and
   placing said sample and said solution on opposite sides of a hydrophobic microporous membrane;
   wherein said nonhalide salts are selected from the group consisting of tripotassium orthophosphate ($K_3PO_4$), dipotassium monohydrogen orthophosphate ($K_2HPO_4$), potassium dihydrogen orthophosphate ($KH_2PO_4$), tetrapotassium pyrophosphate ($K_4P_2O_7$), tripotassium monohydrogen pyrophosphate ($K_3HP_2O_7$), dipotassium dihydrogen pyrophosphate ($K_2H_2P_2O_7$), monopotassium trihydrogen pyrophosphate ($KH_3P_2O_7$), and blends thereof.

2. The method of claim 1 wherein said sample is a liquid.

3. The method of claim 2 wherein said liquid is a fruit juice, a vegetable juice, a liquid dairy product, a plant extract, or animal-extract.

4. The method of claim 2 wherein said liquid is a solution of a pharmaceutical or biological product.

5. The method of claim 4 wherein said liquid is a solution of a vaccine, an antibiotic, a peptide hormone, a regulatory peptide, or a vitamin.

6. A method of osmotic distillation for the concentration of a sample of relatively low osmotic pressure comprising:

providing a sample to be concentrated having a first osmotic pressure;

providing a solution having a higher osmotic pressure than said sample, said solution comprising a saturated or near-saturated aqueous solution containing one or more nonhalide salts, wherein said salts are chemically stable at temperatures up to the normal boiling point of the saturated solution of said salts, non-toxic to humans and animals, odorless and tasteless in aqueous solution, substantially incapable of forming precipitates when exposed to volatile components of feed solutions to be concentrated, non-corrosive to process equipment, and have large positive temperature coefficients of solubility in aqueous solution; and placing said sample and said solution on opposite sides of a hydrophobic microporous membrane;

wherein said nonhalide salt is selected from the group consisting of tripotassium orthophosphate, dipotassium hydrogen orthophosphate, potassium dihydrogen orthophosphate, and blends thereof.

7. A method of osmotic distillation for the concentration of a sample of relatively low osmotic pressure comprising:

providing a sample to be concentrated having a first osmotic pressure;

providing a solution having a higher osmotic pressure than said sample, said solution comprising a saturated or near-saturated aqueous solution containing one or more nonhalide salts, wherein said salts are chemically stable at temperatures up to the normal boiling point of the saturated solution of said salts, non-toxic to humans and animals, odorless and tasteless in aqueous solution, substantially incapable of forming precipitates when exposed to volatile components of feed solutions to be concentrated, non-corrosive to process equipment, and have large positive temperature coefficients of solubility in aqueous solution; and placing said sample and said solution on opposite sides of a hydrophobic microporous membrane;

wherein said nonhalide salt is selected from the group consisting of tetrapotassium pyrophosphate, tripotassium monohydrogen pyrophosphate, dipotassium dihydrogen pyrophosphate, monopotassium trihydrogen pyrophosphate, and blends thereof.

8. A method for the simultaneous osmotic distillation and removal of carbon dioxide from a sample of relatively low osmotic pressure comprising:

providing a sample to be concentrated having a first osmotic pressure and dissolved carbon dioxide;

providing a solution having a higher osmotic pressure than said sample, said solution comprising an aqueous alkaline solution of a nonhalide salt, wherein said salt is selected from the group consisting of tripotassium orthophosphate, dipotassium hydrogen orthophosphate, tetrapotassium pyrophosphate, tripotassium hydrogen pyrophosphate, dipotassium dihydrogen pyrophosphate, and blends thereof; and placing said sample and said solution on opposite sides of a hydrophobic microporous membrane.

9. An osmotic distillation apparatus comprising a hydrophobic microporous membrane having opposing surfaces; a sample to be concentrated contacting one of said surfaces; and a strip solution contacting the other of said surfaces, said strip solution comprising a saturated or near saturated solution of one or more aqueous salts selected from the group consisting of tripotassium orthophosphate ($K_3PO_4$), dipotassium monohydrogen orthophosphate ($K_2HPO_4$), potassium dihydrogen orthophosphate ($KH_2PO_4$), tetrapotassium pyrophosphate ($K_4P_2O_7$), tripotassium monohydrogen pyrophosphate ($K_3HP_2O_7$), dipotassium dihydrogen pyrophosphate ($K_2H_2P_2O_7$), monopotassium trihydrogen pyrophosphate ($KH_3P_2O_7$), and blends thereof.

* * * * *